UNITED STATES PATENT OFFICE.

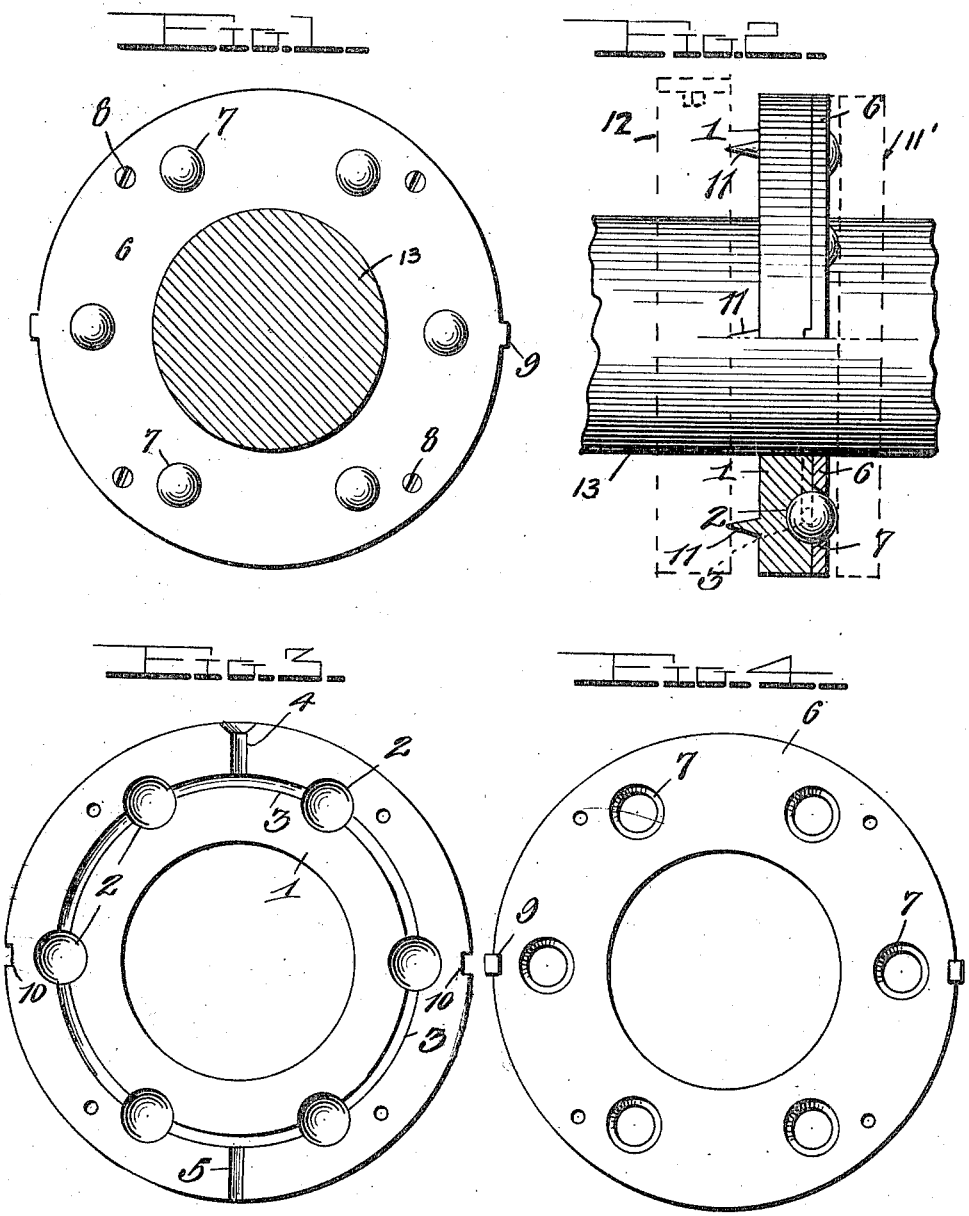

JASPER N. PRESLEY, OF SARDIS, TENNESSEE.

BALL-BEARING WASHER.

1,030,125.   Specification of Letters Patent.   Patented June 18, 1912.

Application filed November 11, 1911. Serial No. 659,768.

*To all whom it may concern:*

Be it known that I, JASPER N. PRESLEY, a citizen of the United States, residing at Sardis, in the county of Henderson and State of Tennessee, have invented certain new and useful Improvements in Ball-Bearing Washers, of which the following is a specification, reference being had to the accompanying drawings.

This invention relates to washers and more particularly to that class of washers that are used in connection with transmission systems, and has for its object to provide a bearing ball washer for use in connection with plates on shafts that come adjacent to journal boxes and the like.

Another object of this invention is to have the device arranged so that it can be readily inspected and repaired whenever desirable, and to arrange it so that it will positively supply lubricant to the moving parts of the bearings.

Other objects of this invention will become apparent as it is more fully set forth.

The device embodying this invention consists essentially of three parts, one of which is arranged to receive bearing balls and to provide a suitable surface on which they can be rotated, another member is arranged to hold said bearing balls in place and the last means consists of the bearing balls themselves, from which it can be seen that the device is comparatively simple in construction.

In the accompanying drawings which illustrate by way of example an embodiment of this invention, Figure 1 represents a view in elevation of a bearing ball washer embodying this invention. Fig. 2 is a side elevation partly in section. Fig. 3 is a detail of the rear portion of the washer. Fig. 4 is a detail of the covering used in connection with a washer for holding the bearing balls properly positioned within the rear portion.

Similar reference characters refer to similar parts throughout the drawings.

Referring to the drawing, the numeral 1 designates the main or body portion of my improved washer, the same being provided in one face with a plurality of recesses 2 for the reception of bearing balls and to permit the same to freely rotate therein. The said body portion 1 is also formed with segmental passages 3 between the recesses 2 and communicating therewith. An oil duct 4 is formed in the body portion 1, whereby lubricant may be supplied to the passages 3 and thence to the recesses 2, and a drain duct 5 is formed in the body portion, preferably in diametrical relation to the duct 4.

6 designates a cover plate which is formed with a plurality of apertures 7 designed to register with the recesses 2 and to permit the bearing balls to protrude therethrough so that when the washer is placed on the shaft adjacent to the journal box, the ball bearings will run on the thrust bearing of the shaft. The edges of the apertures 7 are beveled, as clearly indicated in Fig. 4. Screws 8 or similar fastening devices are provided for holding the body portion and cover together, and lugs 9 are formed on the cover 6 and arranged to fit within notches 10 formed in the body portion 1 so that the relative positions of the parts will always be the same. The body portion 1 and cover 6 are formed with central openings for the reception of the shaft 13.

12 designates a washer and 11' the thrust bearing, with which the bearing balls contact.

The body portion 1 is preferably formed with sharpened projections 11 which are designed to engage the washer 12, whereby the bearing will be maintained properly on the shaft.

Having thus described this invention, what is claimed is:—

A washer of the character described, comprising a body portion formed in one face with a plurality of semispherical recesses arranged at equal intervals and with curved passages connecting said recesses, said body being provided with an oil duct communicating with said passages and with a drain duct leading from said passages, a cover for said body and connected thereto, said cover being formed with a plurality of apertures with beveled edges, the apertures registering with said recesses, a plurality of bearing balls disposed in said recesses and retained therein by said cover and protruding through said apertures, lugs formed on said cover, the body portion being formed with notches for the reception of said lugs, for the purpose specified, and sharpened projections formed on said body portion for engagement with a journal washer.

In testimony whereof I hereunto affix my signature in the presence of two witnesses.

JASPER N. PRESLEY.

Witnesses:
 W. D. WIGHT,
 J. E. VERNON.